(12) United States Patent
Ma et al.

(10) Patent No.: US 8,042,340 B2
(45) Date of Patent: Oct. 25, 2011

(54) METHOD AND SYSTEM FOR MODULATING THE MODIFIED WOBBE INDEX OF A FUEL

(75) Inventors: Jun F. Ma, Greenville, SC (US); Colin Wilkes, Anderson, SC (US)

(73) Assignee: General Electric Company, Schenectady, NY (US)

( * ) Notice: Subject to any disclaimer, the term of this patent is extended or adjusted under 35 U.S.C. 154(b) by 1035 days.

(21) Appl. No.: 11/857,746

(22) Filed: Sep. 19, 2007

(65) Prior Publication Data

US 2009/0071118 A1 Mar. 19, 2009

(51) Int. Cl.
*F02C 3/30* (2006.01)
*F02C 9/40* (2006.01)

(52) U.S. Cl. .................. 60/775; 60/39.26; 60/39.55

(58) Field of Classification Search .............. 60/775, 60/39.3, 39.26, 39.53, 39.55
See application file for complete search history.

(56) References Cited

U.S. PATENT DOCUMENTS

| | | | | |
|---|---|---|---|---|
| 5,357,741 A * | 10/1994 | Talabisco et al. | ............... | 60/775 |
| 6,209,310 B1 * | 4/2001 | Kuenzi et al. | ................... | 60/775 |
| 6,339,926 B1 * | 1/2002 | Ichiro et al. | ................ | 60/39.182 |
| 6,343,462 B1 * | 2/2002 | Drnevich et al. | ............... | 60/775 |
| 6,502,402 B1 * | 1/2003 | Smith et al. | ..................... | 60/775 |
| 6,928,821 B2 * | 8/2005 | Gerhold | .......................... | 60/775 |
| 7,216,486 B2 * | 5/2007 | Doebbeling et al. | ........... | 60/775 |
| 2008/0115482 A1 * | 5/2008 | LaGrow et al. | ............. | 60/39.281 |
| 2008/0295520 A1 * | 12/2008 | Cheng | ............................. | 60/775 |

* cited by examiner

*Primary Examiner* — Ted Kim
(74) *Attorney, Agent, or Firm* — Dale J. Davis; Ernest G. Cusick; Frank A. Landgraff

(57) ABSTRACT

A method and system for modulating the Modified Wobbe Index (MWI) of a fuel is provided. A variety of industrial components, which may require a gas fuel, such as but not limiting of, a heavy-duty gas turbine; an aero-derivative gas turbine; or a boiler may utilize the method and system. The method and system may provide an industrial component comprising at least one steam injection system, wherein the at least one steam injection system injects steam into at least one fuel supply line upstream of a combustion system to modulate the MWI of at least one fuel. The method and system may also determine whether the MWI of the at least one fuel is outside of a predetermined range; and utilize the at least one steam injection system to automatically inject the steam at a flowrate for adjusting the MWI of the at least one fuel.

30 Claims, 6 Drawing Sheets

METHOD AND SYSTEM FOR MODULATING THE MODIFIED WOBBE INDEX OF A FUEL

BACKGROUND OF THE INVENTION

The present invention relates to the gas fuel supplied to a gas turbine, and more particularly to a method and system that utilizes a steam injection system to modulate the properties of the gas fuel.

Due to the continuous surge in natural gas demand, the supply of pipeline natural gas has become unable to satisfy the demand for gas fuel. To meet this shortfall, gas turbines operators are beginning to use liquefied natural gas (LNG) as an alternative gas fuel source. The increase in LNG usage has raised the issue of interchangeability between pipeline supplied natural gas and LNG, when burned in a gas turbine combustion system.

LNG typically has a higher heating value (HHV) and Wobbe Number (described below), than natural gas. LNG may be diluted with an inert such as nitrogen to reduce the Wobbe Number, to that of the pipeline natural gas. However, this process increases the costs and lowers the competitiveness of LNG. Consequently gas suppliers are aiming to expand the allowable gas interchangeability tariff. However, this leads to wider variations in properties of the gas fuel supplied to operators of gas turbines, which may significantly impact the combustion characteristics of a gas turbine combustion system, as described below.

Before the impact on combustion characteristics is discussed, the following two fuel parameters should be defined: the incoming gas Wobbe Number (WN) and the Modified Wobbe Index (MWI) of the gas supplied to the turbine. The WN is defined as:

$$WN = \frac{HHV}{\sqrt{SG}} \qquad [1]$$

where:
HHV is the higher heating value of the gas fuel; and
SG is the specific gravity of the gas fuel or gas fuel and steam mixture relative to air The WN is used as an interchangeability index to permit gas fuels of various heating values to be utilized in the same combustion system without changing hardware. Temperature is not included in this equation for WN because gas is typically delivered at approximately ground temperature with little variation throughout the year.

The MWI is defined as:

$$MWI = \frac{LHV}{\sqrt{(SG \times (460 + T_g)}} \qquad [2]$$

where:
LHV is the lower heating value of the gas fuel or gas fuel and steam mixture; and
$T_g$ is the gas fuel or gas fuel and steam mixture temperature in degrees F.

MWI more accurately measures the energy delivered through a fuel nozzle at a given pressure ratio than WN. This distinction between MWI and WN becomes very important when gas fuel is heated before delivery to the gas turbine.

Driven by market demands, power plant operators could purchase gas from different local pipelines during different times of the day. If the gas between two pipelines exhibits significantly different compositions and heating values, then a "null point" could be created near a power plant located between the natural gas pipeline and the pipeline holding LNG. A power plant situated between the "null point" could experience daily multiple shifts in gas composition. The sudden increase in variation of gas properties across the pipelines due to LNG usage, significantly affects the operability of the combustion system. Since it would be impractical to tune the combustion system to account for this variation, operation beyond the capability of the combustor could result, leading to increased combustion dynamics and operation outside of emissions compliance.

As discussed, some gas suppliers inject inerts, such as N2 or CO2, to control the gas heating value and WN if the gas supply has an unacceptably high WN.

There are a few problems with the currently known systems. The quantity of the inerts injected is minimized because it reduces the HHV value of the gas on a Btu basis. The cost of delivered gas may increase when inerts are utilized to lower the HHV.

For the foregoing reasons, there is a need for a method and system for reducing the HHV of a gas fuel. The method and system should permit adjustment of the MWI over a wide range without the need for significant temperature adjustment of the gas fuel. The method and system should provide a diluent for reducing the LHV and the resulting MWI. The method and system should not require an additional fuel separator and a fuel superheater. The method and system should not significantly increase the cost of delivered gas per unit of energy when compared to aforementioned systems.

BRIEF DESCRIPTION OF THE INVENTION

In accordance with an embodiment of the present invention, a method of modulating a Modified Wobbe Index (MWI) of a fuel utilizing at least one steam injection system, the method comprising: providing a gas turbine comprising at least one steam injection system, wherein the at least one steam injection system injects steam into at least one fuel supply line upstream of a combustion system to modulate the MWI of at least one fuel; determining whether the MWI of the at least one fuel is outside of a predetermined range; and utilizing the at least one steam injection system to automatically inject the steam at a first flowrate for adjusting the MWI of the at least one fuel.

In accordance with an alternate embodiment of the present invention, a method of modulating a Modified Wobbe Index (MWI) of a fuel utilizing at least one steam injection system, the method comprising: providing a gas turbine comprising at least one steam injection system, wherein the at least one steam injection system injects steam into at least one fuel supply line upstream of a combustion system to modulate the MWI of at least one fuel; determining whether the MWI of the at least one fuel is outside of a predetermined range; utilizing the at least one steam injection system to automatically inject steam at a first flowrate for adjusting the MWI of the at least one fuel; determining the MWI of the at least one fuel after the at least one steam injection system has injected steam at the first flowrate; and injecting steam at a second flowrate if the MWI of the at least one fuel is outside of the range after the steam was injected at the first flowrate; or maintaining steam injection at the first flowrate if the MWI of the at least one fuel is within the range after steam was injected at the first flowrate.

In accordance with another alternate embodiment, a system for modulating a Modified Wobbe Index (MWI) of a fuel utilizing at least one steam injection system, the system comprising: a gas turbine comprising at least one steam injection system, wherein the at least one steam injection system comprises at least one control valve and at least one stop valve; wherein the at least one steam injection system injects steam into at least one fuel supply line upstream of a combustion system to modulate the MWI of at least one fuel; means for determining whether the MWI of the at least one fuel is outside of a predetermined range; means for utilizing the at least one steam injection system to automatically inject steam at a first flowrate; and means for injecting steam at a second flowrate if required; or means for maintaining the steam injection at the first flowrate; wherein the at least one steam injection system injects steam into at least one heat exchanger to modulate the MWI of at least one fuel.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

An embodiment of the present invention takes the form of an application and process that may inject superheated steam extracted from either a Heat Recovery Steam Generator (HRSG), a steam turbine of a combined cycle power plant, or other source, into the gas fuel, upstream of the combustion system, to modulate the Modified Wobbe Index (MWI) of the fuel.

An embodiment of the present invention may be applied to either a single heat exchanger or a plurality of heat exchangers.

An embodiment of the present invention has the technical effect of broadening the range of combustor operability limits with respect to the MWI of the supplied gas fuel. As described below, the point of steam injection may be either: down stream of a fuel supply and in between the first and second portions of a first heat exchanger, such as a fuel gas heater; in between a first heat exchanger and a second heat exchanger, or downstream of the first and second heat exchangers and before the gas turbine combustion system; depending on the application.

The present invention may inject a relatively small amount of superheated steam into the gas fuel supply line prior to the gas fuel entering the combustion system. The steam/gas ratio may range from about 1:100 to about 30:100; which may ensure that the superheated steam does not condense in the gas fuel line.

An embodiment of the present invention may be used to control the MWI of various industrial components, which may require a gas fuel. For example, but not limiting of, the present invention may be applied to a heavy duty gas turbine; an aero-derivative gas turbine; or a boiler.

Figure 1:
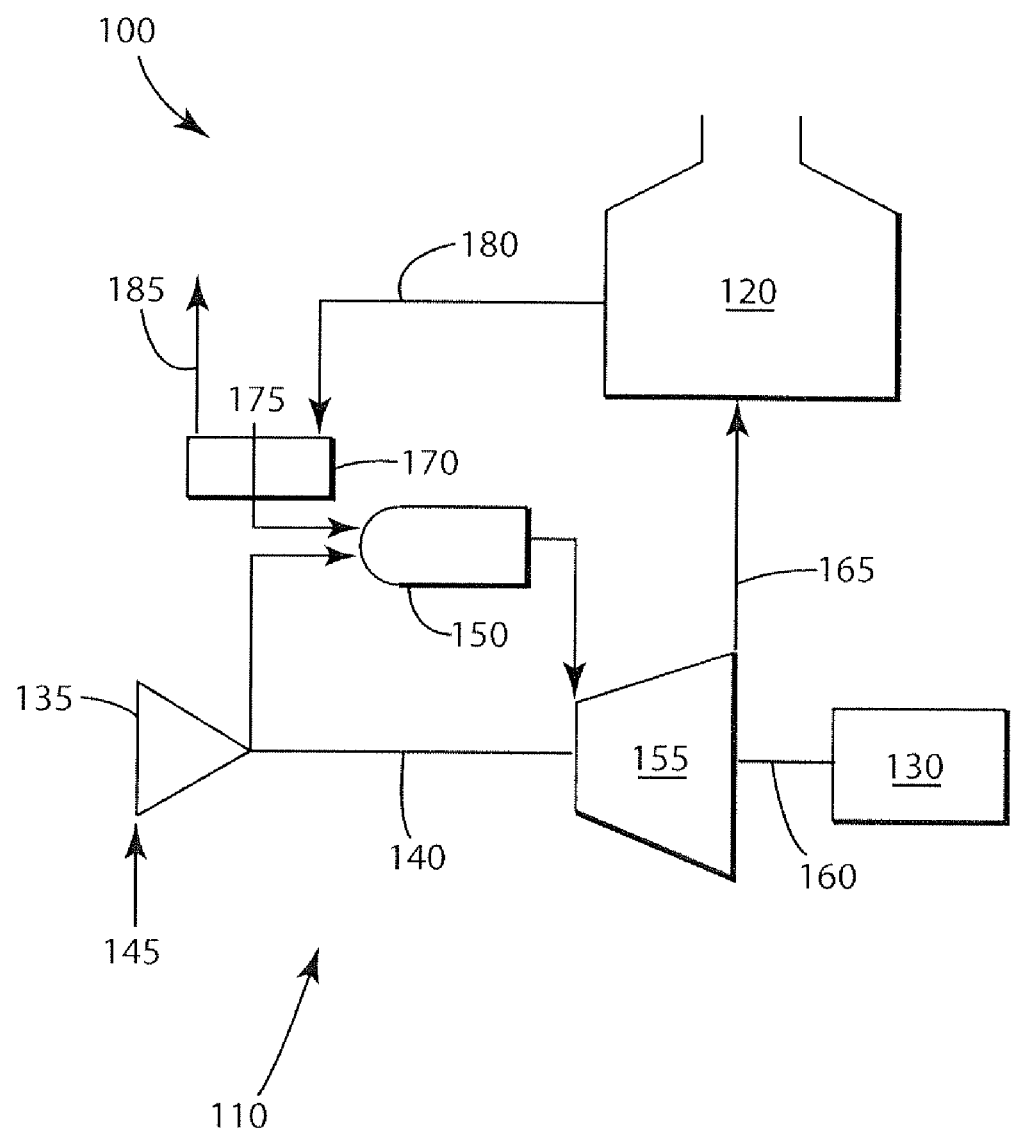
FIG. 1 is a schematic illustrating the environment in which an embodiment of the present invention operates.

Referring now to the Figures, where the various numbers represent like elements throughout the several views, FIG. 1 is a schematic illustrating the environment in which an embodiment of the present invention operates. FIG. 1 illustrates a power plant site 100 comprising a turbine 110; a heat recovery steam generator (HRSG) 120; and a generator 130.

The gas turbine 110 comprises an axial flow compressor 135 having a rotor shaft 140. Air enters the inlet of the compressor at 145, is compressed by the axial flow compressor 135 and then is discharged to a combustion system 150, where fuel such as natural gas is burned to provide high-energy combustion gases which drive the turbine 155. In the turbine 155, the energy of the hot gases is converted into work, some of which is used to drive the compressor 135 through the shaft 140, with the remainder being available for useful work to drive a load such as the generator 130 by means of rotor shaft 160 for producing electricity. A HRSG 120 may receive the exhaust 165 from the turbine 155

The HRSG 120 may provide hot water in a supply path 180 to at least one heat exchanger 170 for heating the supplied fuel 175 prior to entering the combustion system 150, in accordance with at least one embodiment of the present invention. A return path 185 may allow the warm water discharged by the heat exchanger 170 to be received by at least one boiler feed pump (not illustrated) of the HRSG 120.

The gas turbine 110 may comprise at least one control system or the like (not illustrated) which may determine the MWI of the supplied gas fuel 175. The control system may receive data on the properties of fuel 175, for use in determining the MWI.

Figure 2:
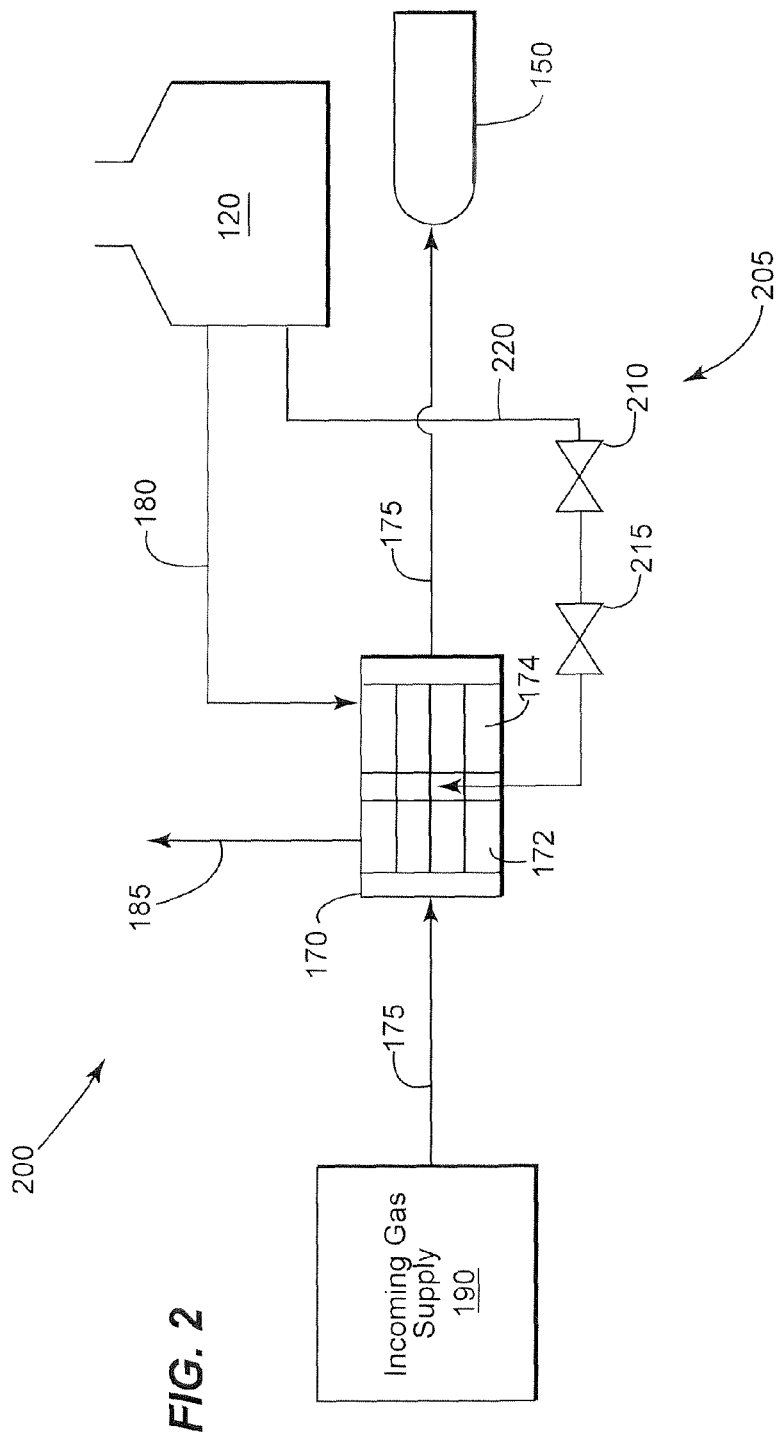
FIG. 2 is a schematic illustrating an example of a system for modulating the MWI of a fuel utilizing steam injection in accordance with an embodiment of the present invention.

FIG. 2 is a schematic illustrating an example of a system 200 for modulating the MWI of a gas fuel 175 utilizing steam injection in accordance with an embodiment of the present invention. As illustrated, the system 200 may be integrated with the power plant site 100 illustrated in FIG. 1. The system 200 includes at least one steam injection system 205; which may include a stop valve 215, a control valve 210, and a steam path 220.

The embodiment of the present invention illustrated in FIG. 2 may include four primary flow paths: for fuel, 175; a supply path 180; a return path 185; and a steam path 220.

The incoming gas supply 190, may initially receive the fuel 175, from a gas supplier. As illustrated in FIG. 2, the fuel 175 may flow downstream of the incoming gas supply 190 to a first heat exchanger 170. The first heat exchanger 170 may receive and condition the fuel 175 prior to entering the combustion system 150. The first heat exchanger 170 may be commonly referred to as a performance heater, or the like, when primarily used to increase the temperature of the supplied fuel 175. After flowing through the first heat exchanger 170, the fuel 175 may flow to the combustion system 150.

An embodiment of the first heat exchanger 170 may include a first portion 172 and a second portion 174. The fuel 175 is commonly received from a gas supplier at ambient ground temperature. To increase the overall performance of the power plant site 100, the temperature of the fuel 175 may be increased. The temperature of the fuel may be increased, for example, but not limiting of, to a range between about 350 to about 500 degrees Fahrenheit. The amount of temperature increase may vary due to, for example, but not limiting of, on the gas turbine type (frame size, or the like) and configuration (combustion system type).

The second portion 174 may receive the supply path 180, which may originally flow from for example, but not limiting of, the HRSG 120. The supply path 180 may primarily serve to increase the temperature of the fuel 175. The supply path 180 may be hot water, as discussed, and have other properties, which ensure that adequate energy is transferred in the heat exchanging process to increase the temperature of fuel 175 to a desired amount, as described above.

The first portion 172 may include the return path 185, which may allow the warm water discharged by the heat exchanger 170 to be received by at least one boiler feed pump (not illustrated) of the HRSG 120, as discussed.

Downstream of the gas supply 190 and the first portion 172 and upstream of the second portion 174, a portion of the path for fuel 175 may receive the steam path 220, of the steam injection system 205.

The steam path 220 may also originally flow from for example, but not limiting of, the HRSG 120. The steam injection system 205 may primarily serve to supply superheated steam for use in modulating the MWI of the fuel 175 (as discussed below). The steam path 220 may flow from downstream of the HRSG 120 to the control valve 210. The control valve 210 may be of a type capable of functioning under the operation conditions associated with the steam injection system 205. The control valve 210 may operate in a linear range allowing for accurate flow control. For example, but not limiting of, the control valve 210 may allow for limiting the flow rate of the superheated steam to between 5-10% of the maximum flowrate through the steam injection system 205.

The steam path 220 may then flow downstream of the control valve 210 to the stop valve 215, which may be of a type capable of functioning under the operation conditions associated with the steam injection system 205.

The steam path 220 may then flow downstream of the stop valve 215 to the second portion 174 of the first heat exchanger 170, where the steam may be introduced and mixed with the fuel 175.

Figure 3:
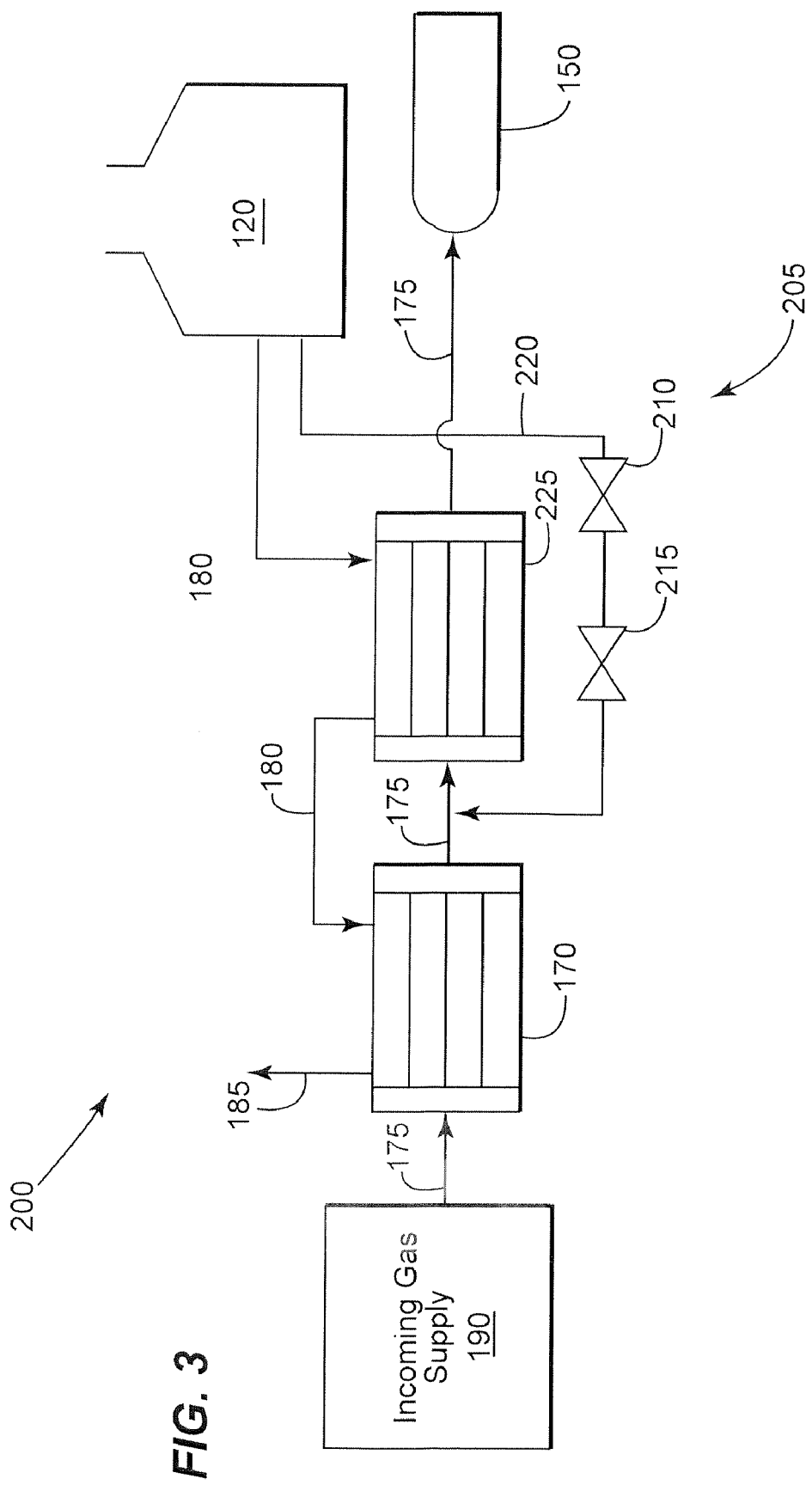
FIG. 3 is a schematic illustrating an example of a system for modulating the MWI of a fuel utilizing steam injection in accordance with an alternate embodiment of the present invention.
Figure 4:
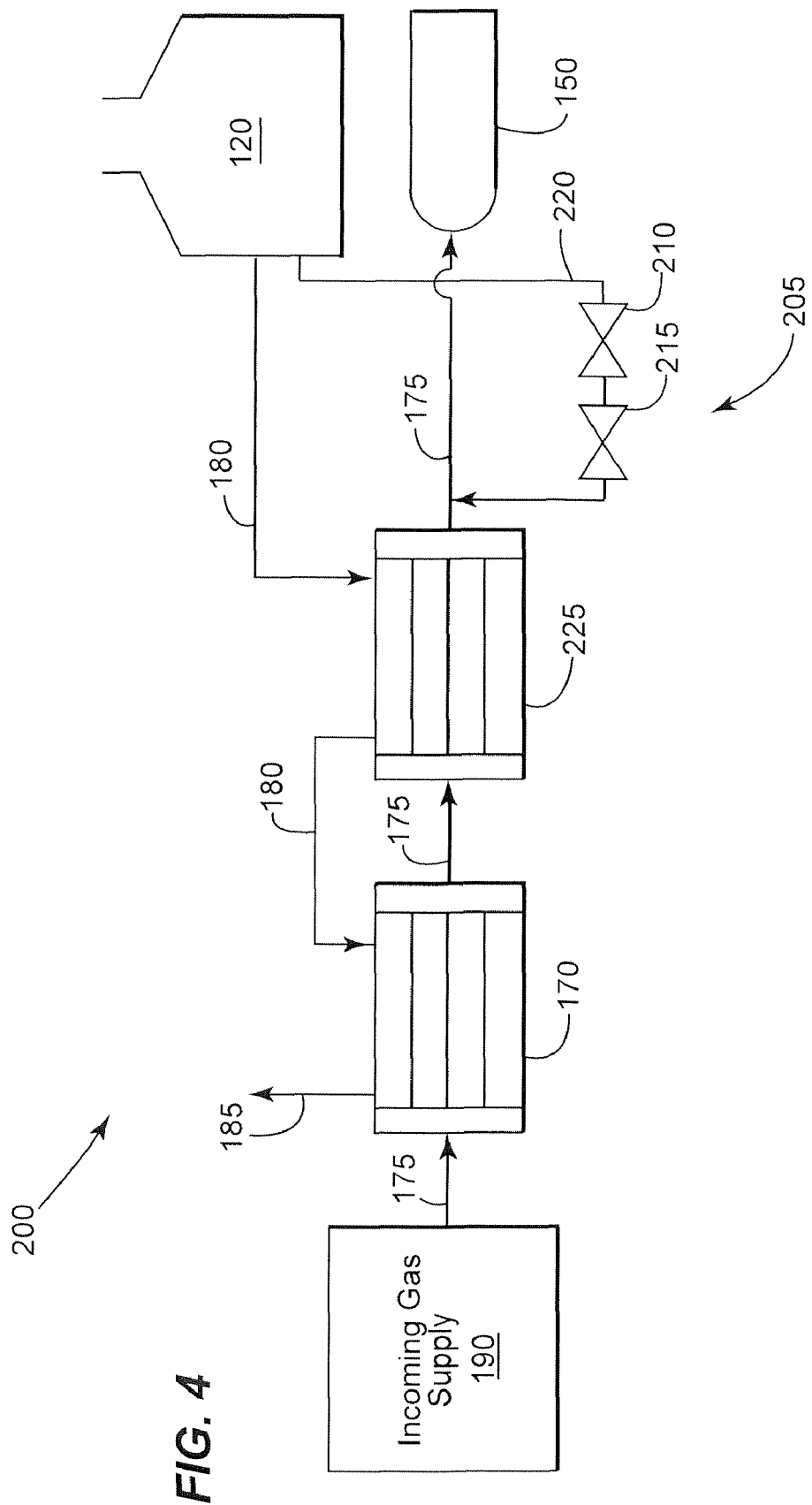
FIG. 4 is a schematic illustrating an example of a system for modulating the MWI of a fuel utilizing steam injection in accordance with another alternate embodiment of the present invention.

FIGS. 3 and 4 illustrate alternate embodiments of the steam injection system 205. As described and illustrated below, these alternate embodiments include a plurality of heat exchangers and varying configurations of the steam path 220. The discussion of FIGS. 3 and 4 will focus on the differences from the embodiment of FIG. 2.

FIG. 3 is a schematic illustrating an example of a system 200 for modulating the MWI of a fuel utilizing steam injection in accordance with an alternate embodiment of the present invention. FIG. 3 illustrates the power plant site 100 having a second heat exchanger 225. The second heat exchanger 225 may be required when the first heat exchanger 170 may only preheat the fuel 175. The second heat exchanger 225 may be connected in tandem, or the like, with the first heat exchanger 170. As illustrated in FIG. 4 the fuel 175 is preheated by the first heat exchanger 170.

The fuel 175 may originate at an incoming gas supply 190, which may be the location on the power plant site 100 that initially receives the fuel 175, from a gas supplier. As illustrated in FIG. 3, the fuel 175 may flow downstream of the incoming gas supply 190 to the first heat exchanger 170, which may start to increase the temperature of the fuel 175 to the desired end temperature. After flowing through the first heat exchanger 170, the fuel 175 may be next received by the second heat exchanger 225. The second heat exchanger 225 may also bring the temperature of the fuel 175 to the desired temperature. After flowing through the second heat exchanger 225, the fuel 175 may flow to the combustion system 150.

As illustrated in FIG. 3, a portion of the second heat exchanger 225 may receive a supply path 180, which may originally flow from for example, but not limiting of, the HRSG 120. The supply path 180 may exit another portion of the second heat exchanger 225 and allow the hot water to enter a portion of the first heat exchanger 170. The return path 185 may then allow the warm water discharged by the heat exchanger 170 to be received by at least one boiler feed pump (not illustrated) of the HRSG 120, as discussed. The supply path 180 may primarily serve to increase the temperature of the fuel 175, as described above.

Downstream of the first heat exchanger and upstream of the second heat exchanger 225, the steam path 220 may be connected to the piping in which the fuel 175 flows, allowing for the fuel 175 and superheated steam to mix. Introducing the superheated steam into the fuel 175 prior to entry in the second heat exchanger 220 may provide for greater control over the MWI value of the fuel 175.

As discussed, the steam path 220 may originally flow from for example, but not limiting of, the HRSG 120. The steam path 220 may flow downstream of the HRSG 120 to the control valve 210. The control valve 210 may be of a type capable of functioning under the operation conditions associated with the steam injection system 205. The control valve 210 may operate in a linear range allowing for accurate flow control, as previously described.

The steam path 220 may then flow downstream of the control valve 210 to the stop valve 215, which may be of a type capable of functioning under the operation conditions associated with the steam injection system 205.

FIG. 4 is a schematic illustrating an example of a system 200 for modulating the MWI of a fuel utilizing steam injection in accordance with another alternate embodiment of the present invention. As illustrated, the system 200 and the configuration of the steam injection system 205 in FIG. 4 may be considered similar to FIG. 3.

The primary difference in embodiment in the present invention illustrated in FIG. 4, in comparison to FIG. 3, is the location where the steam path 220 may be connected with the fuel 175. As illustrated this location may be downstream of the first and second heat exchangers 170, 225.

The configuration of the steam injection system 205 illustrated in FIG. 4 may be useful when the configuration of a power plant site 100 does not allow for the steam path 220 to be connected to the fuel 175 between the first and second heat exchangers 170, 225 as illustrated in FIG. 3.

An embodiment of the present invention may take the form of a software application and process that utilizes a steam injection system 205 to modulate the MWI of a fuel 175.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may include a control system, or the like, configured to automatically or continuously monitor the MWI of the incoming fuel 175 supplied to the power plant site 100 from a gas supplier. Alternatively, the control system may be configured to require a user action to initiate operation of the steam injection system 205. An embodiment of the control system of the present invention may function as a stand-alone system. Alternatively, the control system may be integrated as a module, or the like, within a broader system, such as a turbine control or a plant control system.

Figure 5:
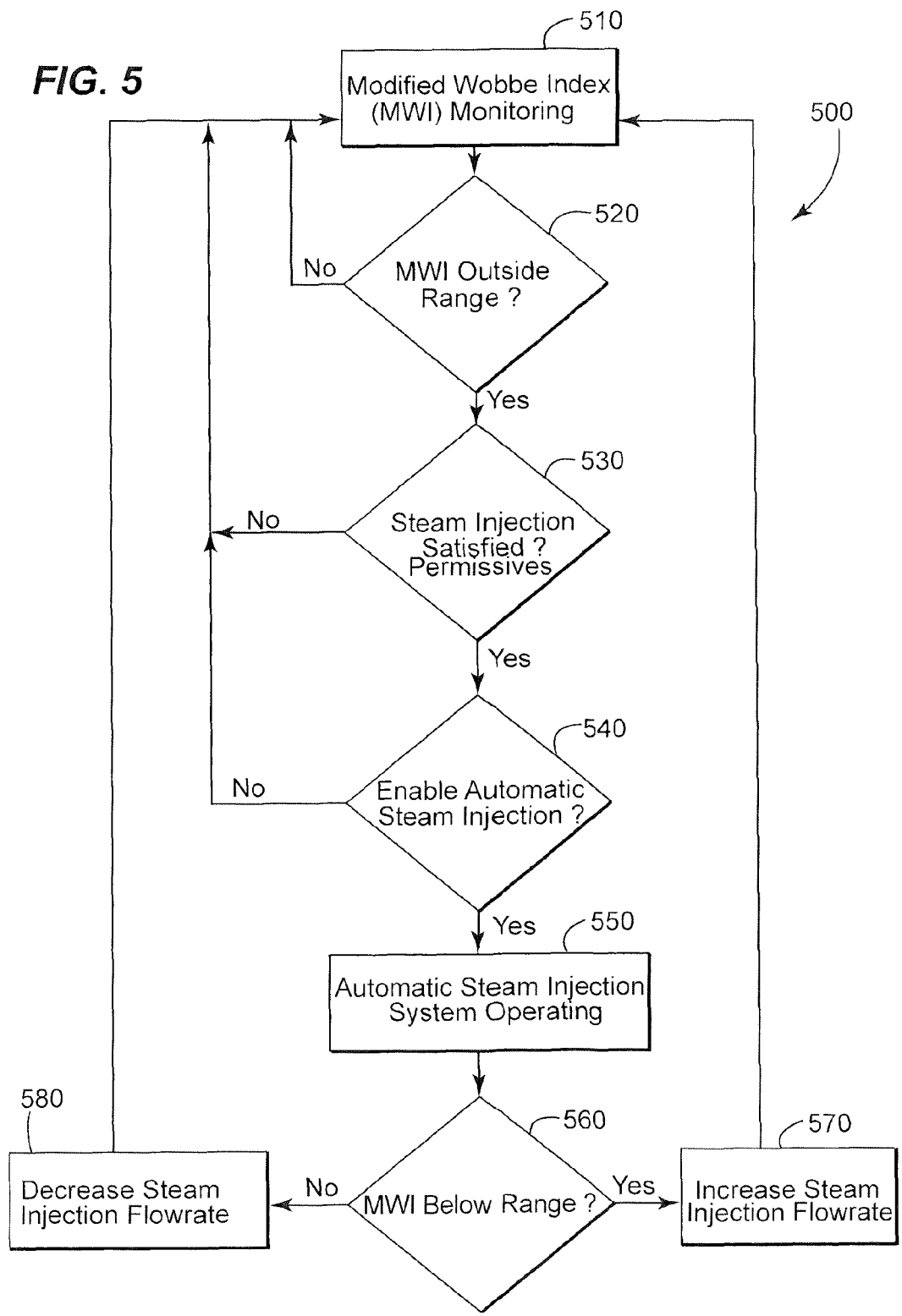
FIG. 5 is a flowchart illustrating an example of a method of modulating the MWI of a fuel utilizing steam injection in accordance with an embodiment of the present invention.

FIG. 5 is a flowchart illustrating an example of a method 500 of modulating the MWI of a fuel utilizing a steam injection system 205 in accordance with an embodiment of the present invention.

In step 510 the method 500 may monitor the MWI of the fuel 175. As discussed, the MWI of the fuel 175 may fluctuate as the power plant site 100 receives the fuel 175 with varying properties. As discussed, the MWI is defined as:

$$MWI = \frac{LHV}{\sqrt{(SG \times (460 + T_g)}}$$

the variables may be defined as:
LHV is the lower heating value of the gas fuel or gas fuel and steam mixture;
SG is the specific gravity of the gas fuel or gas fuel and steam mixture relative to air; and
$T_g$ is the gas fuel or gas fuel and steam mixture temperature in degrees F.

The method 500 may receive data from the control system on the variables within the equation for MWI, and then determine the MWI utilizing the aforementioned equation.

In step 520, the method 500 may determine whether the MWI value determined in step 510 is outside of a desired operating range. The present invention may allow for a user to set the desired range and acceptable deadband for the MWI. This may be useful for example, but not limiting, of, where the combustion system 150 includes replacement nozzles that may operate with a different range of MWI. Here the present invention may allow the user to change the MWI operating range. In alternate embodiment of the present invention, the original equipment manufacturer (OEM) of the combustion system 150 may require that the MWI range is fixed and set by the OEM. If the method 500 determines that the MWI is outside of the desired range and an acceptable deadband, then the method 500 may proceed to step 530, otherwise the method 500 may revert to step 510.

In step 530, the method may determine whether at least one steam injection system 205 permissive is satisfied. An embodiment of the present invention may allow the user to configure at least one steam injection permissive. The at least one steam injection permissive may include one of the following permissives: the gas turbine 110 is operating on a gas fuel; the gas fuel 175 temperature is between about 350 to about 500 degrees Fahrenheit; the gas turbine 110 is operating on temperature control; steam temperature and pressure are operating within ranges specific to the power plant site 100; superheated steam has preheated the steam path 220; maintain about 50 degrees Fahrenheit of superheat temperature above the saturation steam temperature; steam injection system 205 flowrate limited to 30% of the maximum gas fuel flow rate. If the steam injection permissive is satisfied, then the method 500 may proceed to step 540; otherwise the method 500 may revert to step 510.

In step 540, the method 500 may enable the steam injection system 205 to operate. An embodiment of the present invention may prompt the user to enable the steam injection system 205 to operate. In an alternate embodiment of the present invention, the method 500 may be self-enabling after the steam injection permissive is satisfied in step 530. If the steam injection system 205 is enabled, then the method 500 may proceed to step 550; otherwise the method 500 may revert to step 510.

In step 550, the method 500 may begin operating the steam injection system 205. A user may pre-configure the method 500 to automatically start of after step 540 is satisfied. A user may desire this option if, for example, the operation of the steam injection system 205 is conducted remotely. Alternatively, the method 500 may be pre-configured to require a user action to start the steam injection system 205. The user action may be, but is not limited to, selecting a "steam injection system start" button, or the like, on a display where the steam injection system 205 may be controlled.

In step 560, the method 500 may determine whether the MWI value is below a desired operating range and deadband. The method 500 may determine the effect on the MWI on the fuel 175 since the operation of the steam injection system 205 started. In step 560, the method 500 may determine the new MWI for comparison with the desired MWI range, as previously described in step 520. In step 560, the method 500 may also determine whether the MWI is above a desired range and deadband. If the method 500 determines that the MWI is still above the desired range, then the method 500 may proceed to step 570, otherwise the method 500 may proceed to step 580.

In step 570, the method 500 may increase the flowrate of the steam injection system 205 to decrease the MWI. A user may increase the stroke of the control valve 215 to increase the flowrate of the steam injection system 205. In an alternate embodiment of the present invention the control system may automatically increase the stroke of the control valve 215. After the method 500, in step 570, increases the flowrate of the steam injection system 205, the method 500 may revert to step 510.

In step 580, the method 500 may decrease the flowrate of the steam injection system 205 to increase the MWI. Here, a user may adjust the stroke of the control valve 215 to decrease the flowrate of the steam injection system 205, as required. In an alternate embodiment of the present invention the control system may automatically adjust the stroke of the control valve 215 to decrease the MWI. After the method 500, in step 580, decreases the flowrate of the steam injection system 205, the method 500 may revert to step 510.

Figure 6:
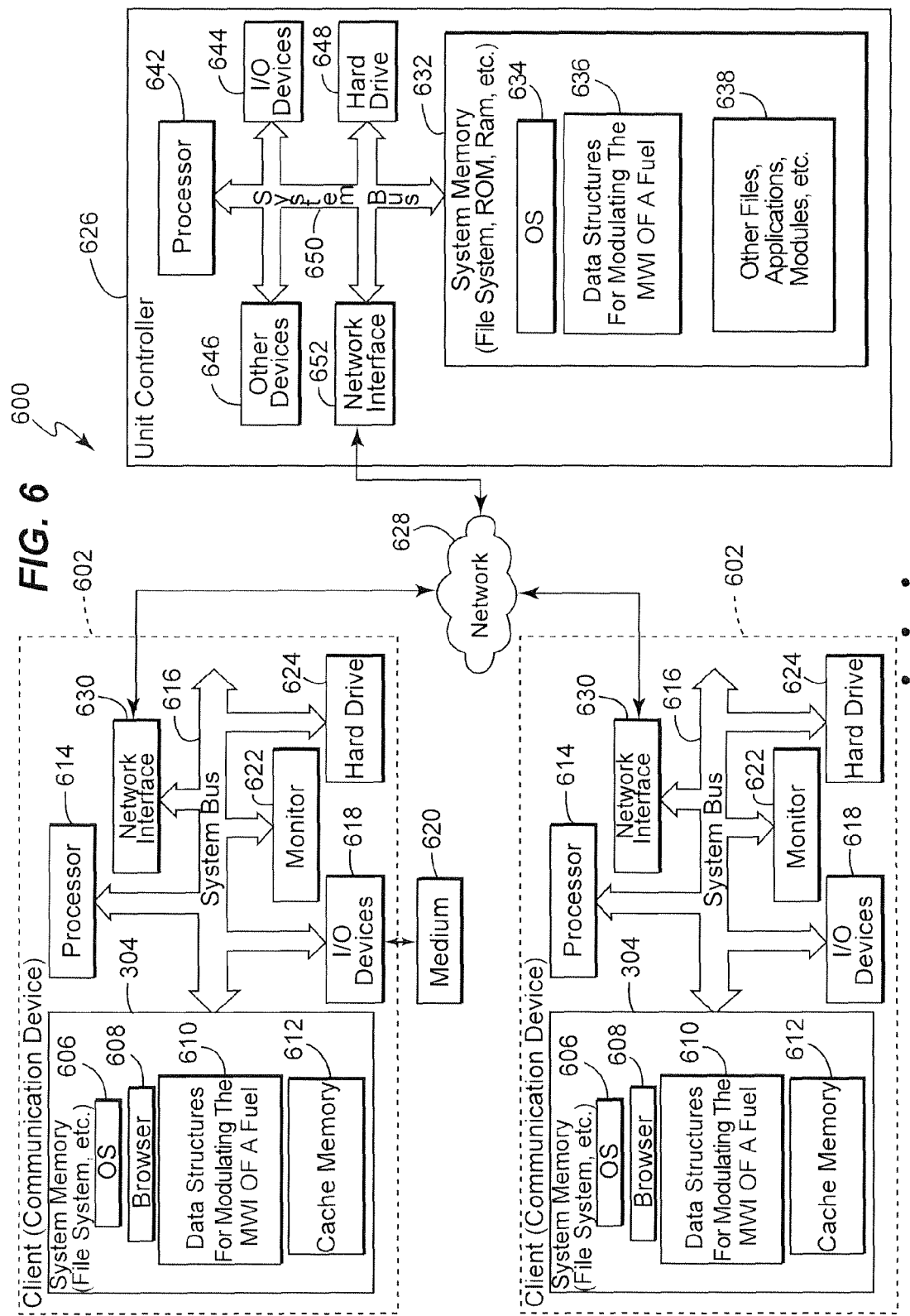
FIG. 6 is a block diagram of an exemplary system for predicting the emissions of a gas turbine in accordance with an embodiment of the present invention.

Referring now to FIG. 6, which is a step diagram of an exemplary system 600 for modulating the MWI of a fuel in accordance with an embodiment of the present invention. The elements of the method 500 may be embodied in and performed by the system 600. The system 600 may include one or more user or client communication devices 602 or similar systems or devices (two are illustrated in FIG. 6). Each communication device 602 may be for example, but not limited to, a computer system, a personal digital assistant, a cellular phone, or similar device capable of sending and receiving an electronic message.

The communication device 602 may include a system memory 604 or local file system. The system memory 604 may include for example, but is not limited to, a read only memory (ROM) and a random access memory (RAM). The ROM may include a basic input/output system (BIOS). The BIOS may contain basic routines that help to transfer information between elements or components of the communication device 602. The system memory 604 may contain an operating system 606 to control overall operation of the communication device 602. The system memory 604 may also include a browser 608 or web browser. The system memory 604 may also include data structures 510 or computer-executable code to modulate the MWI of a fuel may be similar or include elements of the method 500 in FIG. 5.

The system memory 604 may further include a template cache memory 612, which may be used in conjunction with the method 500 in FIG. 5 to modulate the MWI of a fuel.

The communication device 602 may also include a processor or processing unit 614 to control operations of the other components of the communication device 602. The operating system 606, browser 608, data structures 610 may be operable on the processor 614. The processor 614 may be coupled to the memory system 604 and other components of the communication device 602 by a system bus 616.

The communication device 602 may also include multiple input devices (I/O), output devices or combination input/output devices 618. Each input/output device 618 may be coupled to the system bus 616 by an input/output interface (not shown in FIG. 6). The input and output devices or combination I/O devices 618 permit a user to operate and interface with the communication device 602 and to control operation of the browser 608 and data structures 610 to access, operate and control the software to modulate the MWI of a fuel. The I/O devices 618 may include a keyboard and computer pointing device or the like to perform the operations discussed herein.

The I/O devices 618 may also include for example, but are not limited to, disk drives, optical, mechanical, magnetic, or infrared input/output devices, modems or the like. The I/O devices 618 may be used to access a medium 620. The medium 620 may contain, store, communicate, or transport computer-readable or computer-executable instructions or other information for use by or in connection with a system, such as the communication devices 602.

The communication device 602 may also include or be connected to other devices, such as a display or monitor 622. The monitor 622 may be used to permit the user to interface with the communication device 602.

The communication device 602 may also include a hard disk drive 624. The hard drive 624 may be coupled to the system bus 616 by a hard drive interface (not shown in FIG. 6). The hard drive 624 may also form part of the local file system or system memory 604. Programs, software, and data may be transferred and exchanged between the system memory 604 and the hard drive 624 for operation of the communication device 602.

The communication device 602 may communicate with a remote server 626 and may access other servers or other communication devices similar to communication device 602 via a network 628. The system bus 616 may be coupled to the network 628 by a network interface 630. The network interface 630 may be a modem, Ethernet card, router, gateway, or the like for coupling to the network 628. The coupling may be a wired or wireless connection. The network 628 may be the Internet, private network, an intranet, or the like.

The server 626 may also include a system memory 632 that may include a file system, ROM, RAM, and the like. The system memory 632 may include an operating system 634 similar to operating system 606 in communication devices 602. The system memory 632 may also include data structures 636 for to modulating the MWI of a fuel. The data structures 636 may include operations similar to those described with respect to the method 500 to modulating the MWI of a fuel. The server system memory 632 may also include other files 638, applications, modules, and the like.

The server 626 may also include a processor 642 or a processing unit to control operation of other devices in the server 626. The server 626 may also include I/O device 644. The I/O devices 644 may be similar to I/O devices 618 of communication devices 602. The server 626 may further include other devices 646, such as a monitor or the like to provide an interface along with the I/O devices 644 to the server 626. The server 626 may also include a hard disk drive 648. A system bus 650 may connect the different components of the server 626. A network interface 652 may couple the server 626 to the network 628 via the system bus 650.

The flowcharts and step diagrams in the Figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of modulating a Modified Wobbe Index (MWI) of a fuel utilizing at least one steam injection system, the method comprising:
    providing a gas turbine comprising at least one steam injection system, wherein the at least one steam injection system injects steam into at least one fuel supply line upstream of a combustion system to modulate the MWI of at least one fuel;
    providing a heat exchanger comprising a first portion and a second portion, wherein the steam injection system injects steam between the first portion and the second portion of the heat exchanger and downstream of a fuel supply;
    determining whether the MWI of the at least one fuel is outside of a predetermined range; and
    utilizing the at least one steam injection system to automatically inject the steam at a first flowrate for adjusting the MWI of the at least one fuel.

2. The method of claim 1, further comprising:
    determining the MWI of the at least one fuel after the at least one steam injection system has injected steam at the first flowrate; and
    injecting steam at a second flowrate if the MWI of the at least one fuel is outside of the range after the steam was injected at the first flowrate; or
    maintaining steam injection at the first flowrate if the MWI of the at least one fuel is within the range after steam was injected at the first flowrate.

3. The method of claim 1 further comprising determining whether at least one steam injection system permissive is maintained.

4. The method of claim 3, wherein the at least one steam injection system permissive comprises at least one of:
    the gas turbine is operating on a gas fuel;
    a gas fuel temperature is between about 350 to about 500 degrees Fahrenheit;
    the gas turbine is operating on temperature control;
    a steam temperature and a steam pressure of the steam injection system are within the required operating ranges;
    a superheated steam has preheated a steam flow path of the steam injection system;
    the steam injected is maintained at about 50 degrees Fahrenheit greater than the steam saturation temperature; and
    a steam injection system flowrate is limited to a range of from about 1% to about 30% of the gas fuel flowrate.

5. The method of claim 1, wherein the at least one steam injection system comprises at least one control valve and at least one stop valve, and wherein the operation of the at least one steam injection system comprises:
    stroking the at least one control valve; and
    stroking the at least one stop valve.

6. A method of modulating a Modified Wobbe Index (MWI) of a fuel utilizing at least one steam injection system, the method comprising:
    providing a gas turbine comprising at least one steam injection system, wherein the at least one steam injection system injects steam into at least one fuel supply line upstream of a combustion system to modulate the MWI of at least one fuel;
    providing a heat exchanger comprising a first portion and a second portion, wherein the steam injection system injects steam between the first portion and the second portion of the heat exchanger and downstream of a fuel supply;
    determining whether the MWI of the at least one fuel is outside of a predetermined range;
    utilizing the at least one steam injection system to automatically inject steam at a first flowrate for adjusting the MWI of the at least one fuel;
    determining the MWI of the at least one fuel after the at least one steam injection system has injected steam at the first flowrate; and
    injecting steam at a second flowrate if the MWI of the at least one fuel is outside of the range after the steam was injected at the first flowrate; or
    maintaining steam injection at the first flowrate if the MWI of the at least one fuel is within the range after steam was injected at the first flowrate.

7. The method of claim 6, further comprising determining whether at least one steam injection system permissive is maintained, wherein the at least one steam injection system permissive comprises at least one of:
the gas turbine is operating on a gas fuel;
a gas fuel temperature is between about 350 to about 500 degrees Fahrenheit;
the gas turbine is operating on temperature control;
a steam temperature and a steam pressure of the steam injection system are within the required operating ranges;
a superheated steam has preheated a steam flow path of the steam injection system;
the steam injected is maintained at about 50 degrees Fahrenheit greater than the steam saturation temperature; and
a steam injection system flowrate is limited to a range of from about 1% to about 30% of the gas fuel flowrate.

8. The method of claim 6, wherein the at least one steam injection system comprises at least one control valve and at least one stop valve, and wherein the operation of the at least one steam injection system comprises:
stroking the at least one control valve; and
stroking the at least one stop valve.

9. A system for modulating a Modified Wobbe Index (MWI) of a fuel utilizing at least one steam injection system, the system comprising:
a gas turbine comprising at least one steam injection system, wherein the at least one steam injection system comprises at least one control valve and at least one stop valve; wherein the at least one steam injection system injects steam into at least one fuel supply line upstream of a combustion system to modulate the MWI of at least one fuel;
a heat exchanger comprising a first portion and a second portion, wherein the at least one steam injection system injects steam between the first portion and the second portion of the heat exchanger and downstream of a fuel supply;
means for determining whether the MWI of the at least one fuel is outside of a predetermined range;
means for utilizing the at least one steam injection system to automatically inject steam at a first flowrate; and
means for injecting steam at a second flowrate if required; or
means for maintaining the steam injection at the first flowrate;
wherein the at least one steam injection system injects steam between the first portion and the second portion of the heat exchanger and downstream of a fuel supply to modulate the MWI of at least one fuel.

10. The system of claim 9, further comprising means for determining whether at least one steam injection system permissive is maintained, wherein the at least one steam injection system permissive comprises at least one of:
the gas turbine is operating on a gas fuel;
a gas fuel temperature is between about 350 to about 500 degrees Fahrenheit;
the gas turbine is operating on temperature control;
a steam temperature and a steam pressure of the steam injection system are within the required operating ranges;
a superheated steam has preheated a steam flow path of the steam injection system;
the steam injected is maintained at about 50 degrees Fahrenheit greater than the steam saturation temperature; and
a steam injection system flowrate is limited to a range of from about 1% to about 30% of the gas fuel flowrate.

11. A method of modulating a Modified Wobbe Index (MWI) of a fuel utilizing at least one steam injection system, the method comprising:
providing a gas turbine comprising at least one steam injection system, wherein the at least one steam injection system injects steam into at least one fuel supply line upstream of a combustion system to modulate the MWI of at least one fuel;
providing a first heat exchanger and a second heat exchanger, wherein the steam injection system injects steam between the first heat exchanger and the second heat exchanger;
determining whether the MWI of the at least one fuel is outside of a predetermined range; and
utilizing the at least one steam injection system to automatically inject the steam at a first flowrate for adjusting the MWI of the at least one fuel.

12. The method of claim 11, further comprising:
determining the MWI of the at least one fuel after the at least one steam injection system has injected steam at the first flowrate; and
injecting steam at a second flowrate if the MWI of the at least one fuel is outside of the range after the steam was injected at the first flowrate; or
maintaining steam injection at the first flowrate if the MWI of the at least one fuel is within the range after steam was injected at the first flowrate.

13. The method of claim 11 further comprising determining whether at least one steam injection system permissive is maintained.

14. The method of claim 13, wherein the at least one steam injection system permissive comprises at least one of:
the gas turbine is operating on a gas fuel;
a gas fuel temperature is between about 350 to about 500 degrees Fahrenheit;
the gas turbine is operating on temperature control;
a steam temperature and a steam pressure of the steam injection system are within the required operating ranges;
a superheated steam has preheated a steam flow path of the steam injection system;
the steam injected is maintained at about 50 degrees Fahrenheit greater than the steam saturation temperature; and
a steam injection system flowrate is limited to a range of from about 1% to about 30% of the gas fuel flowrate.

15. The method of claim 11, wherein the at least one steam injection system comprises at least one control valve and at least one stop valve, and wherein the operation of the at least one steam injection system comprises:
stroking the at least one control valve; and
stroking the at least one stop valve.

16. A method of modulating a Modified Wobbe Index (MWI) of a fuel utilizing at least one steam injection system, the method comprising:
providing a gas turbine comprising at least one steam injection system, wherein the at least one steam injection system injects steam into at least one fuel supply line upstream of a combustion system to modulate the MWI of at least one fuel;
providing a first heat exchanger and a second heat exchanger, wherein the steam injection system injects steam downstream of the first heat exchanger and the second heat exchanger and upstream of the combustion system;
determining whether the MWI of the at least one fuel is outside of a predetermined range; and utilizing the at least one steam injection system to automatically inject the steam at a first flowrate for adjusting the MWI of the at least one fuel.

17. The method of claim 16, further comprising:
determining the MWI of the at least one fuel after the at least one steam injection system has injected steam at the first flowrate; and
injecting steam at a second flowrate if the MWI of the at least one fuel is outside of the range after the steam was injected at the first flowrate; or
maintaining steam injection at the first flowrate if the MWI of the at least one fuel is within the range after steam was injected at the first flowrate.

18. The method of claim 16 further comprising determining whether at least one steam injection system permissive is maintained.

19. The method of claim 18, wherein the at least one steam injection system permissive comprises at least one of:
the gas turbine is operating on a gas fuel;
a gas fuel temperature is between about 350 to about 500 degrees Fahrenheit;
the gas turbine is operating on temperature control;
a steam temperature and a steam pressure of the steam injection system are within the required operating ranges;
a superheated steam has preheated a steam flow path of the steam injection system;
the steam injected is maintained at about 50 degrees Fahrenheit greater than the steam saturation temperature; and
a steam injection system flowrate is limited to a range of from about 1% to about 30% of the gas fuel flowrate.

20. The method of claim 16, wherein the at least one steam injection system comprises at least one control valve and at least one stop valve, and wherein the operation of the at least one steam injection system comprises:
stroking the at least one control valve; and
stroking the at least one stop valve.

21. A method of modulating a Modified Wobbe Index (MWI) of a fuel utilizing at least one steam injection system, the method comprising:
providing a gas turbine comprising at least one steam injection system, wherein the at least one steam injection system injects steam into at least one fuel supply line upstream of a combustion system to modulate the MWI of at least one fuel;
providing a first heat exchanger and a second heat exchanger, wherein the steam injection system injects steam between the first heat exchanger and the second heat exchanger;
determining whether the MWI of the at least one fuel is outside of a predetermined range;
utilizing the at least one steam injection system to automatically inject steam at a first flowrate for adjusting the MWI of the at least one fuel;
determining the MWI of the at least one fuel after the at least one steam injection system has injected steam at the first flowrate; and
injecting steam at a second flowrate if the MWI of the at least one fuel is outside of the range after the steam was injected at the first flowrate; or
maintaining steam injection at the first flowrate if the MWI of the at least one fuel is within the range after steam was injected at the first flowrate.

22. The method of claim 21, further comprising determining whether at least one steam injection system permissive is maintained, wherein the at least one steam injection system permissive comprises at least one of:
the gas turbine is operating on a gas fuel;
a gas fuel temperature is between about 350 to about 500 degrees Fahrenheit;
the gas turbine is operating on temperature control;
a steam temperature and a steam pressure of the steam injection system are within the required operating ranges;
a superheated steam has preheated a steam flow path of the steam injection system;
the steam injected is maintained at about 50 degrees Fahrenheit greater than the steam saturation temperature; and
a steam injection system flowrate is limited to a range of from about 1% to about 30% of the gas fuel flowrate.

23. The method of claim 21, wherein the at least one steam injection system comprises at least one control valve and at least one stop valve, and wherein the operation of the at least one steam injection system comprises:
stroking the at least one control valve; and
stroking the at least one stop valve.

24. A method of modulating a Modified Wobbe Index (MWI) of a fuel utilizing at least one steam injection system, the method comprising:
providing a gas turbine comprising at least one steam injection system, wherein the at least one steam injection system injects steam into at least one fuel supply line upstream of a combustion system to modulate the MWI of at least one fuel;
providing a first heat exchanger and a second heat exchanger, wherein the steam injection system injects steam downstream of the first heat exchanger and the second heat exchanger and upstream of the combustion system;
determining whether the MWI of the at least one fuel is outside of a predetermined range;
utilizing the at least one steam injection system to automatically inject steam at a first flowrate for adjusting the MWI of the at least one fuel;
determining the MWI of the at least one fuel after the at least one steam injection system has injected steam at the first flowrate; and
injecting steam at a second flowrate if the MWI of the at least one fuel is outside of the range after the steam was injected at the first flowrate; or
maintaining steam injection at the first flowrate if the MWI of the at least one fuel is within the range after steam was injected at the first flowrate.

25. The method of claim 24, further comprising determining whether at least one steam injection system permissive is maintained, wherein the at least one steam injection system permissive comprises at least one of:
the gas turbine is operating on a gas fuel;
a gas fuel temperature is between about 350 to about 500 degrees Fahrenheit;
the gas turbine is operating on temperature control;
a steam temperature and a steam pressure of the steam injection system are within the required operating ranges;
a superheated steam has preheated a steam flow path of the steam injection system;
the steam injected is maintained at about 50 degrees Fahrenheit greater than the steam saturation temperature; and
a steam injection system flowrate is limited to a range of from about 1% to about 30% of the gas fuel flowrate.

26. The method of claim 24, wherein the at least one steam injection system comprises at least one control valve and at least one stop valve, and wherein the operation of the at least one steam injection system comprises:

stroking the at least one control valve; and
stroking the at least one stop valve.

27. A system for modulating a Modified Wobbe Index (MWI) of a fuel utilizing at least one steam injection system, the system comprising:
- a gas turbine comprising at least one steam injection system, wherein the at least one steam injection system comprises at least one control valve and at least one stop valve; wherein the at least one steam injection system injects steam into at least one fuel supply line upstream of a combustion system to modulate the MWI of at least one fuel;
- a first heat exchanger and a second heat exchanger, wherein the at least one steam injection injects steam between the first heat exchanger and the second heat exchanger;
- means for determining whether the MWI of the at least one fuel is outside of a predetermined range;
- means for utilizing the at least one steam injection system to automatically inject steam at a first flowrate; and
- means for injecting steam at a second flowrate if required; or
- means for maintaining the steam injection at the first flowrate;
- wherein the at least one steam injection system injects steam adjacent at least one heat exchanger to modulate the MWI of at least one fuel.

28. The system of claim 27, further comprising means for determining whether at least one steam injection system permissive is maintained, wherein the at least one steam injection system permissive comprises at least one of:
- the gas turbine is operating on a gas fuel;
- a gas fuel temperature is between about 350 to about 500 degrees Fahrenheit;
- the gas turbine is operating on temperature control;
- a steam temperature and a steam pressure of the steam injection system are within the required operating ranges;
- a superheated steam has preheated a steam flow path of the steam injection system;
- the steam injected is maintained at about 50 degrees Fahrenheit greater than the steam saturation temperature; and
- a steam injection system flowrate is limited to a range of from about 1% to about 30% of the gas fuel flowrate.

29. A system for modulating a Modified Wobbe Index (MWI) of a fuel utilizing at least one steam injection system, the system comprising:
- a gas turbine comprising at least one steam injection system, wherein the at least one steam injection system comprises at least one control valve and at least one stop valve; wherein the at least one steam injection system injects steam into at least one fuel supply line upstream of a combustion system to modulate the MWI of at least one fuel;
- a first heat exchanger and a second heat exchanger, wherein the at least one steam injection system injects steam downstream of the first heat exchanger and the second heat exchanger and upstream of the combustion system;
- means for determining whether the MWI of the at least one fuel is outside of a predetermined range;
- means for utilizing the at least one steam injection system to automatically inject steam at a first flowrate; and
- means for injecting steam at a second flowrate if required; or
- means for maintaining the steam injection at the first flowrate;
- wherein the at least one steam injection system injects steam downstream of the first heat exchanger and the second heat exchanger and upstream of the combustion system to modulate the MWI of at least one fuel.

30. The system of claim 29, further comprising means for determining whether at least one steam injection system permissive is maintained, wherein the at least one steam injection system permissive comprises at least one of:
- the gas turbine is operating on a gas fuel;
- a gas fuel temperature is between about 350 to about 500 degrees Fahrenheit;
- the gas turbine is operating on temperature control;
- a steam temperature and a steam pressure of the steam injection system are within the required operating ranges;
- a superheated steam has preheated a steam flow path of the steam injection system;
- the steam injected is maintained at about 50 degrees Fahrenheit greater than the steam saturation temperature; and
- a steam injection system flowrate is limited to a range of from about 1% to about 30% of the gas fuel flowrate.

* * * * *